United States Patent
Xu (10) Patent No.: US 9,900,875 B2
(45) Date of Patent: Feb. 20, 2018

(54) METHOD FOR CONFIGURING RESOURCE, METHOD FOR RECEIVING DOWNLINK CONTROL INFORMATION, AND TERMINAL DEVICE

(71) Applicant: Huawei Device Co., Ltd., Shenzhen (CN)

(72) Inventor: Guanbin Xu, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 259 days.

(21) Appl. No.: 14/570,086

(22) Filed: Dec. 15, 2014

(65) Prior Publication Data

US 2015/0092735 A1    Apr. 2, 2015

Related U.S. Application Data

(63) Continuation of application No. PCT/CN2013/077214, filed on Jun. 14, 2013.

(30) Foreign Application Priority Data

Jun. 15, 2012 (CN) .......................... 2012 1 0197831

(51) Int. Cl.
   *H04W 72/04*  (2009.01)
   *H04W 72/00*  (2009.01)
   (Continued)

(52) U.S. Cl.
   CPC ......... *H04W 72/042* (2013.01); *H04L 5/0053* (2013.01); *H04W 72/00* (2013.01);
   (Continued)

(58) Field of Classification Search
   None
   See application file for complete search history.

(56) References Cited

U.S. PATENT DOCUMENTS 8,848,638 B2 * 9/2014 Axmon ................. H04W 48/12
                                                        370/329
2011/0310769 A1   12/2011 Lee et al.
(Continued)

FOREIGN PATENT DOCUMENTS

CN    102143532 A    8/2011
CN    102223412 A    10/2011
(Continued)

OTHER PUBLICATIONS

Partial English Translation and Abstract of Chinese Patent Application No. CN102378211A, Jan. 5, 2015, 8 pages.
(Continued)

*Primary Examiner* — Candal Elpenord
(74) *Attorney, Agent, or Firm* — Conley Rose, P.C.

(57) ABSTRACT

A method for configuring a resource, a method for receiving downlink control information, and a terminal device. A method for configuring a narrowband downlink transmission channel resource includes separating one narrowband downlink transmission channel resource from a system downlink data channel resource, so that a machine type communication user equipment (MTC UE) receives downlink control information or downlink data information using the narrowband downlink transmission channel resource; and dividing the narrowband downlink transmission channel resource into one physical downlink data channel resource and multiple enhanced physical downlink control channel resources, where the multiple enhanced physical downlink control channel resources jointly control the one physical downlink data channel resource. The embodiments of the present invention can further decrease a baseband cost of an MTC UE under the premise of ensuring that a capacity of the MTC UE is not limited.

19 Claims, 4 Drawing Sheets

(51) Int. Cl.
H04L 5/00 (2006.01)
H04W 92/18 (2009.01)
(52) U.S. Cl.
CPC .......... H04L 5/0007 (2013.01); H04L 5/0044 (2013.01); H04W 92/18 (2013.01)

(56) References Cited

U.S. PATENT DOCUMENTS

| | | | | |
|---|---|---|---|---|
| 2013/0083753 | A1* | 4/2013 | Lee | H04W 72/0453 370/329 |
| 2013/0242770 | A1* | 9/2013 | Chen | H04W 52/243 370/252 |
| 2013/0242947 | A1* | 9/2013 | Chen | H04W 72/04 370/335 |
| 2013/0301552 | A1* | 11/2013 | Xu | H04W 4/005 370/329 |
| 2014/0233538 | A1 | 8/2014 | Zhang et al. | |

FOREIGN PATENT DOCUMENTS

| | | |
|---|---|---|
| CN | 102300331 A | 12/2011 |
| CN | 102378211 A | 3/2012 |

OTHER PUBLICATIONS

"3rd Generation Partnership Project; Technical Specification Group Radio Access Network; Study on provision of low-cost MTC UE based on LTE; (Release 11)," 3GPP TR 36.888, V2.0.0, June 2012, Technical Report, 23 pages.

"3rd Generation Partnership Project; Technical Specification Group Radio Access Network; Evolved Univeral Terrestrial Radio Access (E-UTRA); Physical Channels and Modulation (Release 10)," 3GPP TS 36.211, V10.4.0, Dec. 2011, 95 pages.

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.5.0, Mar. 2012, 79 pages.

"3rd Generation Partnership Project; Technical Specification Group Radio Access Network; Evolved Universal Terrestrial Radio Access (E-UTRA); Physical layer procedures (Release 10)," 3GPP TS 36.213, V10.5.0, Mar. 2012, 125 pages.

Foreign Communication From A Counterpart Application, PCT Application No. PCT/CN2013/077214, English Translation of International Search Report dated Sep. 19, 2013, 2 pages.

Foreign Communication From A Counterpart Application, PCT Application No. PCT/CN2013/077214, English Translation of Written Opinion dated Sep. 19, 2013, 12 pages.

"The VU-ePDCCH design framework," 3GPP TSG RAN WG1 Meeting #67, R1-113691, Nov. 14-18, 2011, 9 pages.

"Review of approaches for bandwidth reduction for low complexity MTC LTE UEs," 3GPP TSG RAN WG1 Meeting #67, R1-114267, Nov. 14-18, 2011, 5 pages.

"Search space design for enhanced PDCCH," 3GPP TSG RAN WG1 Meeting #68, R1-120236, Feb. 6-10, 2012, 4 pages.

"On ePDCCH search spaces," 3GPP TSG-RAN WG1 Meeting #68, R1-120383, Feb. 6-10, 2012, 3 pages.

"Search Space Design for Downlink Control Channel," 3GPP TSG RAN WG1 Meeting #68, R1-120752, Feb. 6-10, 2012, 6 pages.

Foreign Communication From A Counterpart Application, European Application No. 13803952.4, Extended European Search Report dated Mar. 16, 2015, 9 pages.

* cited by examiner

METHOD FOR CONFIGURING RESOURCE, METHOD FOR RECEIVING DOWNLINK CONTROL INFORMATION, AND TERMINAL DEVICE

CROSS-REFERENCE TO RELATED APPLICATION

This application is a continuation of International Application No. PCT/CN2013/077214, filed on Jun. 14, 2013, which claims priority to Chinese Patent Application No. 201210197831.3, filed on Jun. 15, 2012, both of which are hereby incorporated by reference in their entireties.

TECHNICAL FIELD

The present invention relates to the field of communications technologies, and in particular, to a method and a communication apparatus for configuring a narrowband downlink transmission channel resource, a method and an apparatus for transmitting downlink control information, and a method and a terminal device for receiving downlink control information, which are applicable to Machine Type Communication (MTC) services.

BACKGROUND

MTC services in the field of life applications and communications are becoming more and more popular, and the market is unceasingly increasing. Many machine type communication user equipment (MTC UE) are low cost terminals, and are oriented to low data rate applications. Therefore, currently, MTC UEs can operate well in a Global System for Mobile communications (GSM) or General Packet Radio Service (GPRS) technology network.

Because there are more and more MTC services, it is possible that the number of MTC UEs reaches ten times that of normal user equipment (UE) in the next few years, and therefore MTC relies more and more on the GSM/GPRS network. Meanwhile, with the development of Long Term Evolution (LTE), operators hope to reduce Radio Access Technologies (RAT), so as to reduce maintenance costs of the entire network and improve efficiency and value of the spectrum. In view of the above, a necessary condition for an MTC user to be willing to migrate from a GSM/GPRS network to an LTE network is to provide a low cost MTC UE based on the LTE network.

It is known that decreasing a baseband bandwidth that the MTC UE can support is an effective method for decreasing the cost of the MTC UE. In addition, the number of users (that is, capacity) that can be supported by the LTE network is directly limited by a system bandwidth, and is mainly limited by a bandwidth used by a control channel (for example, an enhanced physical downlink control channel).

Therefore, how to further decrease the baseband cost of the MTC UE under the premise of ensuring that the capacity of the MTC UE is not limited becomes an issue to be settled urgently.

SUMMARY

Embodiments of the present invention provide a method and a communication apparatus for configuring a downlink transmission channel resource, a method and a terminal device for receiving downlink control information, and a method and an apparatus for transmitting downlink control information, which are aimed at solving a problem of how to further decrease a baseband cost of an MTC UE under the premise of ensuring that a capacity of an MTC UE is not limited.

According to one aspect, a method for configuring a narrowband downlink transmission channel resource is provided, including separating one narrowband downlink transmission channel resource from a system downlink data channel resource, so that an MTC UE receives downlink control information or downlink data information using the narrowband downlink transmission channel resource; and dividing the narrowband downlink transmission channel resource into one physical downlink data channel resource and multiple enhanced physical downlink control channel resources, where the multiple enhanced physical downlink control channel resources jointly control the one physical downlink data channel resource.

According to another aspect, a method for receiving downlink control information is provided, including blindly detecting, by an MTC UE, control information scrambled by a random access radio network temporary identity in multiple enhanced physical downlink control channel resources of a narrowband downlink transmission channel resource, where the multiple enhanced physical downlink control channel resources and one physical downlink data channel resource constitute the narrowband downlink transmission channel resource, and the multiple enhanced physical downlink control channel resources jointly control the one physical downlink data channel resource; and receiving, by the MTC UE, downlink control information in an enhanced physical downlink control channel resource where the blindly-detected control information is located.

According to another aspect, a method for transmitting downlink control information is provided, where the method includes sending downlink control information scrambled by a system information radio network temporary identity or a paging radio network temporary identity to an MTC UE in multiple enhanced physical downlink control channel resources, where the multiple enhanced physical downlink control channel resources and one physical downlink data channel resource constitute a narrowband downlink transmission channel resource, and the multiple enhanced physical downlink control channel resources jointly control the one physical downlink data channel resource.

According to another aspect, a communication apparatus for configuring a narrowband downlink transmission channel resource is provided, where the communication apparatus includes a first configuring unit configured to separate one narrowband downlink transmission channel resource from a system downlink data channel resource, so that an MTC UE receives downlink control information or downlink data information using the narrowband downlink transmission channel resource; and a second configuring unit configured to divide the narrowband downlink transmission channel resource into one physical downlink data channel resource and multiple enhanced physical downlink control channel resources, where the multiple enhanced physical downlink control channel resources jointly control the one physical downlink data channel resource.

According to another aspect, a terminal device is provided, wherein the terminal device is an MTC device, where the terminal device includes a blind-detecting unit configured to blindly detect control information scrambled by a random access radio network temporary identity in multiple enhanced physical downlink control channel resources of a narrowband downlink transmission channel resource, where the multiple enhanced physical downlink control channel resources and one physical downlink data channel resource constitute the narrowband downlink transmission channel resource, and the multiple enhanced physical downlink control channel resources jointly control the one physical downlink data channel resource; and a receiving unit configured to receive, by the MTC UE, downlink control information in an enhanced physical downlink control channel resource where the blindly-detected control information is located.

According to another aspect, an apparatus for transmitting downlink control information is provided, where the apparatus includes a first sending unit configured to send downlink control information scrambled by a system information radio network temporary identity or a paging radio network temporary identity to an MTC UE in multiple enhanced physical downlink control channel resources, where the multiple enhanced physical downlink control channel resources and one physical downlink data channel resource constitute a narrowband downlink transmission channel resource, and the multiple enhanced physical downlink control channel resources jointly control the one physical downlink data channel resource.

It can be seen that, when the manner of configuring a narrowband downlink transmission channel resource according to the embodiments of the present invention is adopted, under the premise of ensuring that the capacity of an MTC UE is not limited, the narrowband downlink transmission channel resource is further divided into multiple enhanced physical downlink control channel resources for use by different MTC UE groups, and the multiple enhanced physical downlink control channel resources jointly use one physical downlink data channel resource, thereby reducing baseband processing complexity when the MTC UE transmits downlink control information, and further decreasing a baseband cost when the MTC UE transmits downlink control information.

It should be noted herein that, the narrowband downlink transmission channel resource herein is relative to the system downlink data channel resource. That is, a bandwidth of the narrowband downlink transmission channel resource is narrower than a bandwidth of the system downlink data channel resource. It is understandable that, with the constant increase of the bandwidth of the system downlink data channel resource of a communication network, a system downlink data channel resource of an earlier generation communication network is also a narrowband downlink transmission channel resource relative to a system downlink data channel resource of a later generation communication network.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

The technical solution of the present invention is applicable to various communication systems, for example, a Global System for Mobile communications (GSM), a Code Division Multiple Access (CDMA) system, a Wideband Code Division Multiple Access (WCDMA) system, a General Packet Radio Service (GPRS) system, and a Long Term Evolution (LTE) system.

A UE, also called a mobile terminal or a mobile user equipment, may communicate with one or more core networks through a radio access network (RAN). The user equipment may be a mobile terminal, such as a mobile phone (or called a "cellular" phone) and a computer equipped with a mobile terminal, for example, may be a portable, pocket-sized, handheld, computer-embedded, or vehicle-mounted mobile apparatus, which exchanges languages and/or data with the radio access network.

A base station may be a base transceiver station (BTS) in GSM or CDMA, a base station (NodeB) in WCDMA, or may be an evolved base station (eNB) or evolutional Node B (e-NodeB) in LTE. For ease of description, the embodiments of the present invention are described using LTE as an example.

Figure 1:
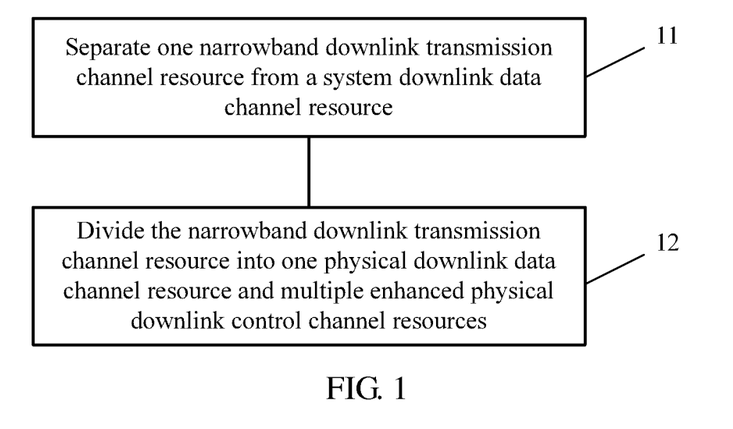
FIG. 1 is a flowchart of a method for configuring a narrowband downlink transmission channel resource according to an embodiment of the present invention.

An embodiment of the present invention provides a method for configuring a narrowband downlink transmission channel. As shown in FIG. 1, the method includes the following steps:

11: Separate one narrowband downlink transmission channel resource from a system downlink data channel resource, so that an MTC UE receives downlink control information or downlink data information using the narrowband downlink transmission channel resource.

12: Divide the narrowband downlink transmission channel resource into one physical downlink data channel resource and multiple enhanced physical downlink control channel resources, where the multiple enhanced physical downlink control channel resources jointly control the one physical downlink data channel resource.

A frequency domain bandwidth of the narrowband downlink transmission channel resource is a part of a system bandwidth, and in a time domain, the narrowband downlink transmission channel resource occupies the same number of symbols as the system downlink data channel resource. Here, a transmission bandwidth of each of the enhanced physical downlink control channel resources is at least two physical resource blocks.

Therefore, in view of defects of the prior art, in the embodiment of the present invention, one narrowband downlink transmission channel resource is separated for an MTC UE from a system downlink data channel resource, and the narrowband downlink transmission channel resource for the MTC UE is divided into one physical downlink data channel resource and multiple enhanced physical downlink control channel resources, where the multiple enhanced physical downlink control channel resources jointly control the one physical downlink data channel resource. An enhanced physical downlink control channel resource in the narrowband downlink transmission channel resource for the MTC UE is divided into multiple enhanced physical downlink control channel resources with smaller bandwidths, thereby further decreasing a bandwidth for the MTC UE to perform downlink baseband processing, to further decrease baseband processing complexity (that is, a cost) of the MTC UE.

Figure 2:
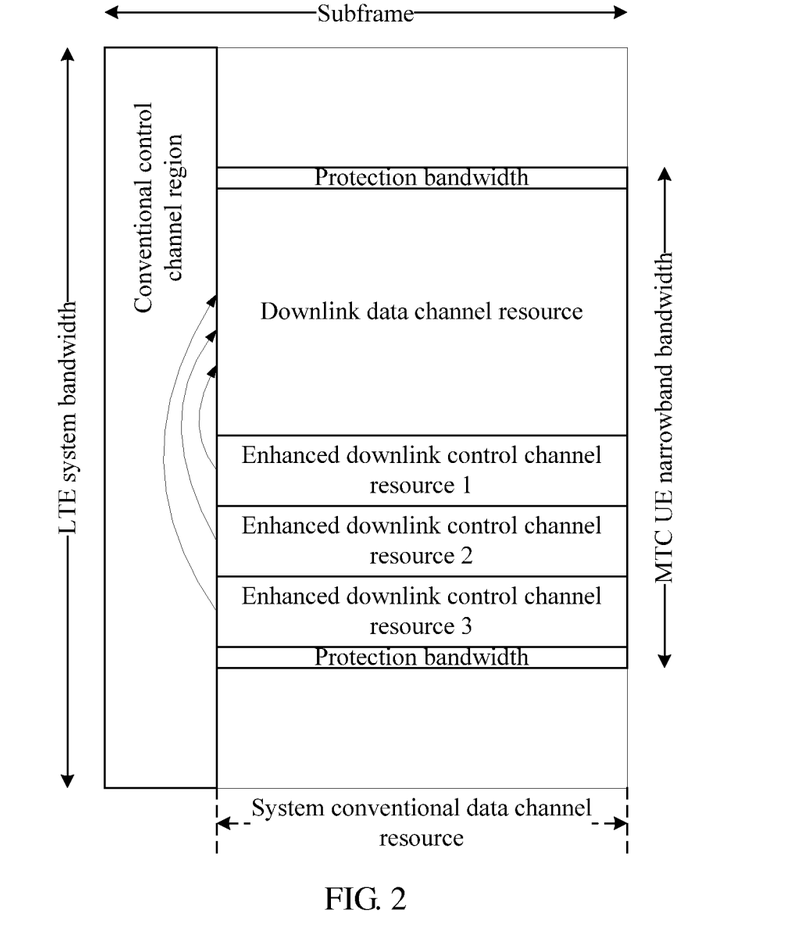
FIG. 2 is a schematic structural diagram of a downlink transmission channel of an MTC UE according to a specific embodiment of the present invention.

As shown in FIG. 2, it is assumed that a narrowband bandwidth of an MTC UE is 3 megahertz (MHz) (corresponding to a transmission bandwidth of 15 physical resource blocks (PRBs)). Here, 8 PRBs are used as a physical downlink data channel resource of all MTC UEs, and 7 PRBs are used as an enhanced physical downlink control channel resource, where the enhanced physical downlink control channel resource of the 7 PRBs is further divided into 3 enhanced physical downlink control channel resources with narrower bandwidths, that is, enhanced physical downlink control channel resource 1 (corresponding to a transmission bandwidth of 2 PRBs), enhanced physical downlink control channel resource 2 (corresponding to a transmission bandwidth of 2 PRBs), and enhanced physical downlink control channel resource 3 (corresponding to a transmission bandwidth of 3 PRBs).

It should be understood that the numbers of PRBs allocated for transmission bandwidths of different enhanced physical downlink control channel resources may be in any combination, but a minimum allowed transmission bandwidth should not be less than 2 PRBs. The number of enhanced physical downlink control channel resources with narrower bandwidths may also be random, but should not be less than two.

It is further assumed that different MTC UEs may be grouped into different MTC UE groups, and one MTC UE group uses only one enhanced physical downlink control channel resource. In the example shown in FIG. 2, the MTC UEs are grouped into three MTC UE groups, where MTC UE group 1 may use enhanced physical downlink control channel resource 1, MTC UE group 2 may use enhanced physical downlink control channel resource 2, and MTC UE group 3 may use enhanced physical downlink control channel resource 3.

For another example, it is assumed that a narrowband bandwidth of an MTC UE is 3 MHz (corresponding to a transmission bandwidth of 15 PRBs). Here, 4 PRBs are used as a physical downlink data channel resource of all MTC UEs, and correspondingly, the enhanced physical downlink control channel resource may be divided into 5 enhanced physical downlink control channel resources (for example, enhanced physical downlink control channel resources 1 to 5) with narrower bandwidths. Each of enhanced physical downlink control channel resources 1 to 4 occupies 2 PRBs, and enhanced physical downlink control channel resource 5 occupies 3 PRBs.

For another example, it is assumed that a narrowband bandwidth of an MTC UE is 3 MHz (corresponding to a transmission bandwidth of 15 PRBs). Here, 6 PRBs are used as a physical downlink data channel resource of all MTC UEs, and correspondingly, the enhanced physical downlink control channel resource may be divided into 4 enhanced physical downlink control channel resources (for example, enhanced physical downlink control channel resources 1 to 4) with narrower bandwidths. Each of enhanced physical downlink control channel resources 1 to 3 occupies 2 PRBs, and enhanced physical downlink control channel resource 3 occupies 3 PRBs.

For another example, it is assumed that a narrowband bandwidth of an MTC UE is 5 MHz (corresponding to a transmission bandwidth of 25 PRBs). Here, the narrowband bandwidth of 5 MHz includes one physical downlink data channel resource and multiple enhanced physical downlink control channel resources, where the multiple enhanced physical downlink control channel resources jointly control the same physical downlink data channel resource. The physical downlink data channel resource may occupy 4, 6, 8, or 10 PRBs, and each of the enhanced physical downlink control channel resources occupies 2 PRBs or 3 PRBs.

In view of the above, the narrowband downlink transmission channel resource constituted according to the embodiment of the present invention only occupies a pair of protection bands, and a conventional data channel resource is divided only once. Therefore, a continuous resource allocation manner of system data channel resources is not much affected.

In addition, after the narrowband physical downlink transmission channel resource is configured between the MTC UE and an eNB according to the foregoing manner, the narrowband downlink transmission channel resource can be used to transmit downlink control information between the MTC UE and the eNB.

Figure 3:
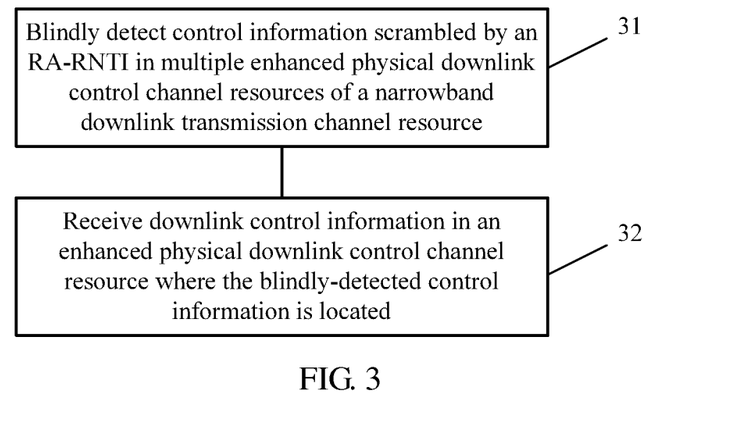
FIG. 3 is a flowchart of a method for receiving downlink control information according to an embodiment of the present invention.

Therefore, an embodiment of the present invention provides a method for receiving downlink control information on an MTC UE side. Referring to FIG. 3, the method includes the following steps:

31: An MTC UE blindly detects control information scrambled by a random access radio network temporary identity (RA-RNTI) in multiple enhanced physical downlink control channel resources of a narrowband downlink transmission channel resource, where the multiple enhanced physical downlink control channel resources and one physical downlink data channel resource constitute the narrowband downlink transmission channel resource, and the multiple enhanced physical downlink control channel resources jointly control the one physical downlink data channel resource.

Here, the narrowband downlink transmission channel resource of the MTC UE is located in a system downlink data channel resource, where a frequency domain bandwidth of the narrowband downlink transmission channel resource of the MTC UE is a part of a system bandwidth, and in a time domain, the narrowband downlink transmission channel resource of the MTC UE occupies the same number of symbols as the system downlink data channel resource. A transmission bandwidth of each of the enhanced physical downlink control channel resources is at least two physical resource blocks.

For example, public information in an LTE system, such as a system information block (SIB) message, a paging message and a random access response (RAR) message, is broadcast by an eNB to all UEs in a cell, including all MTC UEs and all non-MTC UEs.

When the eNB identifies a certain UE as a low cost MTC UE, the eNB allocates a physical downlink control channel (PDCCH), scrambled by the RA-RNTI, of the MTC UE into a certain enhanced physical downlink control channel resource. In this way, the MTC UE blindly detects the RA-RNTI-scrambled PDCCH in all the multiple enhanced physical downlink control channel resources, and attempts to decode downlink control information in the PDCCH. In a subsequent subframe, the eNB allocates all downlink control information of all PDCCHs of the MTC UE into an enhanced physical downlink control channel resource where the successfully decoded RA-RNTI-scrambled PDCCH is located.

32: Therefore, the MTC UE receives downlink control information in an enhanced physical downlink control channel resource where the blindly-detected control information is located. Here, the downlink control information may be public control information of the MTC UE or UE dedicated control information of the MTC UE.

Alternatively, the MTC UE blindly detects control information borne in a control channel in the enhanced physical downlink control channel resource where the successfully decoded RA-RNTI-scrambled PDCCH is located.

In addition, when needing to send a system message, the eNB allocates a PDCCH scrambled by a system information radio network temporary identity (SI-RNTI) in all the multiple enhanced physical downlink control channel resources, and all the multiple SI-RNTI-scrambled PDCCHs jointly control a physical downlink shared channel (PDSCH) scrambled by the SI-RNTI in a downlink data channel of the MTC UE.

In addition, when needing to send paging information, the eNB allocates a PDCCH scrambled by a paging radio network temporary identity (P-RNTI) in all the multiple enhanced physical downlink control channel resources, and all the multiple P-RNTI-scrambled PDCCHs jointly control a P-RNTI-scrambled PDSCH in the downlink data channel of the MTC UE.

As described above, because all the multiple enhanced physical downlink control channel resources jointly control one physical downlink data channel resource, it is only necessary for the eNB to send an SIB message or a paging message instead of sending multiple SIB messages or paging messages, thereby improving air interface spectrum efficiency.

It can be known from the above that the embodiment of the present invention can further decrease baseband processing complexity of an MTC UE under the premise of ensuring that the capacity of the MTC UE is not limited, thereby further decreasing a baseband cost of the MTC UE.

Figure 4:
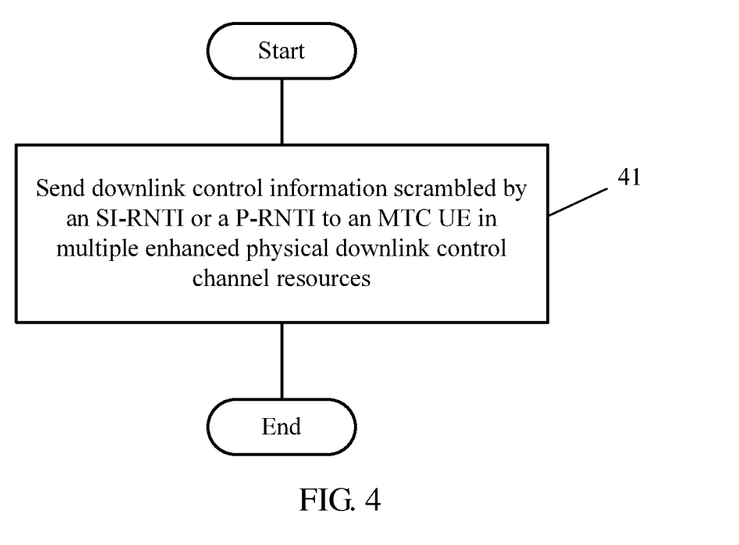
FIG. 4 is a flowchart of a method for transmitting downlink control information according to an embodiment of the present invention.

Correspondingly, a method for transmitting downlink control information on an eNB side will be described below with reference to FIG. 4. Since the method for transmitting downlink control information on the eNB side corresponds to the method for transmitting downlink control information on the MTC UE side, repeated contents will be omitted herein. As shown in FIG. 4, the method for transmitting downlink control information on the eNB side includes the following step:

41: An eNB sends downlink control information scrambled by an SI-RNTI or a P-RNTI to an MTC UE in one of multiple enhanced physical downlink control channel resources.

Alternatively, the eNB sends downlink control information scrambled by an RA-RNTI to the MTC UE in an enhanced physical downlink control channel resource, and the eNB also sends UE dedicated control information to the MTC UE in the one enhanced physical downlink control channel resource.

Here, the multiple enhanced physical downlink control channel resources and one physical downlink data channel resource constitute a narrowband downlink transmission channel resource, and the multiple enhanced physical downlink control channel resources jointly control the one physical downlink data channel resource. A transmission bandwidth of each of the enhanced physical downlink control channel resources is at least two physical resource blocks. The narrowband downlink transmission channel resource is located in a system downlink data channel resource, where a frequency domain bandwidth of the narrowband downlink transmission channel resource is a part of a system bandwidth, and in a time domain, the narrowband downlink transmission channel resource occupies the same number of symbols as the system downlink data channel resource. A transmission bandwidth of each of the enhanced physical downlink control channel resources is at least two physical resource blocks.

Therefore, the embodiment of the present invention can further decrease baseband processing complexity of an MTC UE under the premise of ensuring that the capacity of the MTC UE is not limited, thereby further decreasing a baseband cost of the MTC UE.

Figure 5:
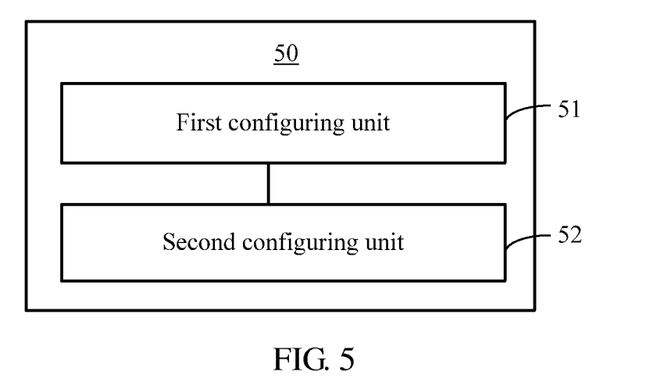
FIG. 5 is a schematic structural diagram of a communication apparatus for configuring a narrowband downlink transmission channel resource according to an embodiment of the present invention.

As shown in FIG. 5, a communication apparatus 50 for configuring a narrowband downlink transmission channel may include a first configuring unit 51 and a second configuring unit 52.

The first configuring unit 51 is configured to separate one narrowband downlink transmission channel resource from a system downlink data channel resource, so that an MTC UE receives downlink control information or downlink data information using the narrowband downlink transmission channel resource. The second configuring unit 52 is configured to divide the narrowband downlink transmission channel resource into one physical downlink data channel resource and multiple enhanced physical downlink control channel resources, where the multiple enhanced physical downlink control channel resources jointly control the one physical downlink data channel resource. A frequency domain bandwidth of the narrowband downlink transmission channel resource is a part of a system bandwidth, and in a time domain, the narrowband downlink transmission channel resource occupies the same number of symbols as the system downlink data channel resource. A transmission bandwidth of each of the enhanced physical downlink control channel resources is at least two physical resource blocks.

It is understandable that the communication apparatus 50 for configuring a narrowband downlink transmission channel resource may be configured on an MTC UE or an eNB. The MTC UE and the eNB may separately use the method shown in FIG. 1 to configure a narrowband downlink transmission channel resource. Alternatively, the MTC UE and the eNB may agree based on a protocol to configure a narrowband downlink transmission channel resource as shown in FIG. 1.

A terminal device, such as an MTC UE, for receiving downlink control information during an MTC service according to an embodiment of the present invention will be described below with reference to FIG. 6 and FIG. 7.

Figure 6:
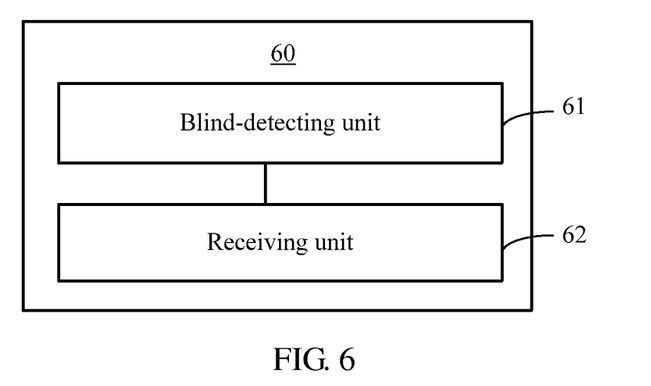
FIG. 6 is a schematic structural diagram of a terminal device for receiving downlink control information according to an embodiment of the present invention.

As shown in FIG. 6, a terminal device 60 includes a blind-detecting unit 61 and a receiving unit 62. The blind-detecting unit 61 is configured to blindly detect control information scrambled by an RA-RNTI in multiple enhanced physical downlink control channel resources of a narrowband downlink transmission channel resource, where the multiple enhanced physical downlink control channel resources and one physical downlink data channel resource constitute the narrowband downlink transmission channel resource, and the multiple enhanced physical downlink control channel resources jointly control the one physical downlink data channel resource. Here, the narrowband downlink transmission channel resource is located in a system downlink data channel resource, where a frequency domain bandwidth of the narrowband downlink transmission channel resource is a part of a system bandwidth, and in a time domain, the narrowband downlink transmission channel resource occupies the same number of symbols as a system downlink data channel resource. A transmission bandwidth of each of the enhanced physical downlink control channel resources is at least two physical resource blocks. The receiving unit 62 is configured to receive downlink control information in an enhanced physical downlink control channel resource where the blindly-detected control information is located.

Therefore, the embodiment of the present invention can further decrease baseband processing complexity of an MTC UE under the premise of ensuring that the capacity of the MTC UE is not limited, thereby further decreasing a baseband cost of the MTC UE.

Figure 7:
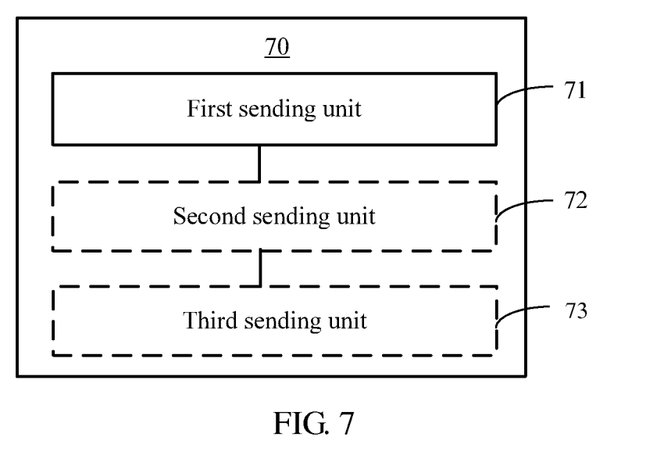
FIG. 7 is a schematic structural diagram of an apparatus for transmitting downlink control information according to an embodiment of the present invention.

In FIG. 7, an apparatus 70 for transmitting downlink control information includes a first sending unit 71. The first sending unit 71 is configured to send downlink control information scrambled by an SI-RNTI or a P-RNTI to an MTC UE in multiple enhanced physical downlink control channel resources. Here, the multiple enhanced physical downlink control channel resources and one physical downlink data channel resource constitute a narrowband downlink transmission channel resource, and the multiple enhanced physical downlink control channel resources jointly control the one physical downlink data channel resource. The narrowband downlink transmission channel resource is located in a system downlink data channel resource, where a frequency domain bandwidth of the narrowband downlink transmission channel resource is a part of a system bandwidth, and in a time domain, the narrowband downlink transmission channel resource occupies the same number of symbols as the system downlink data channel resource. A transmission bandwidth of each of the enhanced physical downlink control channel resources is at least two physical resource blocks.

Optionally, the apparatus 70 for transmitting downlink control information may further include a second sending unit 72 configured to send downlink control information scrambled by an RA-RNTI to the MTC UE in one of the multiple enhanced physical downlink control channel resources.

Optionally, the apparatus 70 for transmitting downlink control information may further include a third sending unit 73 configured to send downlink control information scrambled by an RA-RNTI to the MTC UE in the one multiple enhanced physical downlink control channel resources.

Therefore, the embodiment of the present invention can further decrease baseband processing complexity of an MTC UE under the premise of ensuring that the capacity of the MTC UE is not limited, thereby further decreasing a baseband cost of the MTC UE.

It is easy to understand that the foregoing terminal device 60 implements the method shown in FIG. 3; and the apparatus 70 for transmitting downlink control information implements the method shown in FIG. 4.

A person of ordinary skill in the art can be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It can be clearly understood by a person skilled in the art that, for the purpose of convenient and brief description, for detailed working processes of the foregoing system, apparatuses, and units, reference may be made to corresponding processes in the preceding method embodiments, and details are not described herein again.

In the several embodiments provided in the present application, it should be understood that the disclosed system, apparatus, and method may be implemented in other manners. For example, the foregoing described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or not be physically separate, and parts displayed as units may be or not be physical units, and may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, a network device, or the like) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for configuring a narrowband downlink transmission channel resource, the method comprising:
    separating, by a base station, one narrowband downlink transmission channel resource from a system downlink data channel resource, wherein the narrowband downlink transmission channel resource is used to send downlink control information or downlink data information to a machine type communication user equipment;
    dividing, by the base station, the narrowband downlink transmission channel resource into one physical downlink data channel resource and multiple enhanced physical downlink control channel resources, wherein the multiple enhanced physical downlink control channel resources jointly control the one physical downlink data channel resource; and
    transmitting, by the base station, downlink control information to the machine type communication user equipment using the enhanced physical downlink control channel resources.

2. The method according to claim 1, wherein a frequency domain bandwidth of the narrowband downlink transmission channel resource is a part of a system bandwidth, and wherein the narrowband downlink transmission channel resource occupies the same number of symbols as the system downlink data channel resource in a time domain.

3. The method according to claim 1, wherein a transmission bandwidth of each of the enhanced physical downlink control channel resources is at least two physical resource blocks.

4. A method for receiving downlink control information comprising:
    blindly detecting, by a machine type communication user equipment, control information scrambled by a random access radio network temporary identity in multiple enhanced physical downlink control channel resources of a narrowband downlink transmission channel resource, wherein the multiple enhanced physical downlink control channel resources and one physical downlink data channel resource constitute the narrowband downlink transmission channel resource, and wherein the multiple enhanced physical downlink control channel resources jointly control the one physical downlink data channel resource; and
    receiving, by the machine type communication user equipment, downlink control information in an enhanced physical downlink control channel resource where the blindly-detected control information is located.

5. The method according to claim 4, wherein the narrowband downlink transmission channel resource is located in a system downlink data channel resource, whereina frequency domain bandwidth of the narrowband downlink transmission channel resource is a part of a system bandwidth, and wherein, in a time domain, the narrowband downlink transmission channel resource occupies the same number of symbols as the system downlink data channel resource.

6. The method according to claim 4, wherein a transmission bandwidth of each of the enhanced physical downlink control channel resources is at least two physical resource blocks.

7. A method for transmitting downlink control information comprising;
    scrambling, by a base station, downlink control information using a system information radio network temporary identity or a paging radio network temporary identity: and
    sending by a base station, downlink control information to a machine type communication user equipment in multiple enhanced physical downlink control channel resources,
    wherein the multiple enhanced physical downlink control channel resources and one physical downlink data channel resource constitute a narrowband downlink transmission channel resource, and
    wherein the multiple enhanced physical downlink control channel resources jointly control the one physical downlink data channel resource.

8. The method according to claim 7, wherein the narrowband downlink transmission channel resource is located in a system downlink data channel resource, wherein a frequency domain bandwidth of the narrowband downlink transmission channel resource is a part of a system bandwidth, wherein, in a time domain, the narrowband downlink transmission channel resource occupies the same number of symbols as the system downlink data channel resource, and wherein a transmission bandwidth of each of the enhanced physical downlink control channel resources is at least two physical resource blocks.

9. The method according to claim 7, wherein the downlink control information is in one of the multiple enhanced physical downlink control channel resources.

10. The method according to claim 9 further comprising sending user equipment dedicated control information to the machine type communication user equipment in the one enhanced physical downlink control channel resource.

11. A base station for configuring a narrowband downlink transmission channel resource, the base station comprising:
    at least one processor configured to:
        separate one narrowband downlink transmission channel resource from a system downlink data channel resource; and
        divide the narrowband downlink transmission channel resource into one physical downlink data channel resource and multiple enhanced physical downlink control channel resources, wherein the multiple enhanced physical downlink control channel resources jointly control the one physical downlink data channel resource; and
    a transmitter coupled to the processor and configured to transmit downlink control information to a machine type communication user equipment using the enhanced physical downlink control channel resources.

12. The base station according to claim 11, wherein a frequency domain bandwidth of the narrowband downlink transmission channel resource is a part of a system bandwidth, and wherein the narrowband downlink transmission channel resource occupies the same number of symbols as the system downlink data channel resource in a time domain.

13. The base station according to claim 11, wherein a transmission bandwidth of each of the enhanced physical downlink control channel resources is at least two physical resource blocks, and wherein the narrowband downlink transmission channel resource is used to send downlink control information or downlink data information to a machine type communication user equipment.

14. A terminal device comprising:
at least one processor configured to blindly detect control information scrambled by a random access radio network temporary identity in multiple enhanced physical downlink control channel resources of a narrowband downlink transmission channel resource, wherein the multiple enhanced physical downlink control channel resources and one physical downlink data channel resource constitute the narrowband downlink transmission channel resource, and wherein the multiple enhanced physical downlink control channel resources jointly control the one physical downlink data channel resource; and
a receiver coupled to the processor and configured to receive downlink control information in an enhanced physical downlink control channel resource where the blindly-detected control information is located.

15. The terminal device according to claim 14, wherein the narrowband downlink transmission channel resource is located in a system downlink data channel resource, wherein a frequency domain bandwidth of the narrowband downlink transmission channel resource is a part of a system bandwidth, and wherein the narrowband downlink transmission channel resource occupies the same number of symbols as the system downlink data channel resource in a time domain.

16. The terminal device according to claim 14, wherein a transmission bandwidth of each of the enhanced physical downlink control channel resources is at least two physical resource blocks.

17. An apparatus for transmitting downlink control information comprising:

a processor configured to scramble downlink control information using a system information radio network temporary identity or a paging radio network temporary identity; and
a transmitter coupled to the processor and configured to send the scrambled downlink control information to a machine type communication user equipment in multiple enhanced physical downlink control channel resources,
wherein the multiple enhanced physical downlink control channel resources and one physical downlink data channel resource constitute a narrowband downlink transmission channel resource, and
wherein the multiple enhanced physical downlink control channel resources jointly control the one physical downlink data channel resource.

18. The apparatus according to claim 17, wherein the narrowband downlink transmission channel resource is located in a system downlink data channel resource, wherein a frequency domain bandwidth of the narrowband downlink transmission channel resource is a part of a system bandwidth, wherein, in a time domain, the narrowband downlink transmission channel resource occupies the same number of symbols as the system downlink data channel resource, and wherein a transmission bandwidth of each of the enhanced physical downlink control channel resources is at least two physical resource blocks.

19. The apparatus according to claim 17, wherein the transmitter is further configured to send user equipment dedicated control information to the machine type communication user equipment in one of the multiple enhanced physical downlink control channel resource.

* * * * *

UNITED STATES PATENT AND TRADEMARK OFFICE
CERTIFICATE OF CORRECTION

PATENT NO. : 9,900,875 B2  
APPLICATION NO. : 14/570086  
DATED : February 20, 2018  
INVENTOR(S) : Guanbin Xu Page 1 of 1

It is certified that error appears in the above-identified patent and that said Letters Patent is hereby corrected as shown below:

In the Claims

Column 11; Line 62; Claim 5 should read:  
system downlink data channel resource, wherein a frequency Signed and Sealed this  
Tenth Day of April, 2018

Andrei Iancu  
*Director of the United States Patent and Trademark Office*